United States Patent Office 3,829,440 Patented Aug. 13, 1974

1

2

3,829,440

XANTHENE DERIVATIVES

Albert A. Carr, Cincinnati, and Joyce F. Grunwell, Hamilton, Ohio, assignors to Richardson-Merrell Inc., New York, N.Y.

No Drawing. Filed Dec. 21, 1972, Ser. No. 317,147
Int. Cl. C07d *7/42, 65/16*
U.S. Cl. 260—335 7 Claims

ABSTRACT OF THE DISCLOSURE

Novel 3,6-bis basic ethers and thioethers of 9-(substituted)benzylidenexanthene, their preparation and use for the prevention and inhibition of viral infections are disclosed.

FIELD OF THE INVENTION

This invention relates to new organic chemical compounds, to their preparation, and to pharmaceutical compositions containing such compounds. The compounds described herein are antiviral agents useful in inactivating or inhibiting viruses by their administration to either an infected or a non-infected host, respectively.

BACKGROUND OF THE INVENTION

There is a growing body of information that viruses play a vital rôle in a broad range of diseases, some of which represent the most serious of man's ills. Arthritis, juvenile arthritis, diabetes, Hodgkin's disease and various immunological diseases and degenerative diseases of the central nervous system have been linked to viruses as the causative agents.

At present, the control of virus infections is primarily achieved by means of immunization vaccines. For example, poliomyelitis, smallpox, measles and influenza are well recognized diseases in which viral vaccines have proven effective. In general, however, viral vaccines have had only a moderate success in animal prophylaxis. Each vaccine acts primarily against a specific virus and is not heterophilic in the protection it offers. Hence, vaccines do not provide a practical solution against the wide array of infectious viruses, even when limited, as for example, solely to respiratory viruses.

One approach to the control of virus-related diseases and, particularly to the spread of such virus diseases, has been to search for medicinal agents or chemotherapeutic agents which are capable of inhibiting the growth of viruses, thereby preventing the spread of disease as well as preventing further damage to cells and tissues of the animal host which have not as yet been infected. Heretofore, only a limited number of virus infections such as smallpox, Asian influenza and herpes keratitis have been susceptible to prevention by chemical antiviral agents. Sulfonamides and antibiotics which have revolutionized the treatment of bacterial infections have substantially no effect upon virus infections. Certain infections caused by large viruses, such as lymphogranuloma venereum, psittacosis and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases.

As a result of a long series of investigations, applicants have discovered a novel class of 9-(substituted) benzylidene-3,6-bis basic ethers and thioethers of xanthene which are particularly useful as antiviral agents. These compounds are effective against a variety of viral infections and are useful in treating such infections both prophylactically and therapeutically.

To applicants' knowledge, the compounds described and claimed herein are compounds which have not previously been described nor reported in the literature. The closest prior art known to applicants is Netherlands Pats. 6801093 and 7203258 which disclose mono-substituted ethers of 9-substituted xanthenes and thioxanthenes. In contradistinction thereto the compounds of the present invention are bis basic ethers and thioethers of 9-(substituted)benzylidenexanthenes, which are sufficiently unrelated to the compounds of the prior art, both in their structure and activity, as to be non-obvious to a person having ordinary skill in the art. The instant compounds possess a wide spectrum of antiviral activity in varying degrees which could not have been predicted from a knowledge of the present state of the art.

SUMMARY OF THE INVENTION

This invention relates to new derivatives of xanthene, to their preparation and to their use as pharmaceutical agents. More particularly, the compounds of the present invention are 9-(substituted)benzylidene-3,6-bis basic ethers and thioethers of xanthene which are useful as antiviral agents. Still more particularly the compounds of the present invention may be represented by the following general formula:

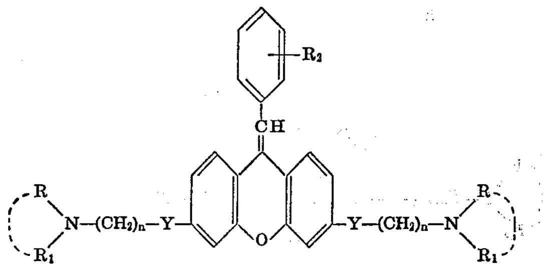

(I)

wherein $n$ is an integer of from 2 to 6; Y is selected from the group consisting of oxygen and sulfur; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical; $R_2$ is selected from the group consisting of hydrogen, halogen, lower alkyl and lower alkoxy; and their pharmaceutically acceptable acid addition salts.

The compounds of the present invention can be prepared using an organo-metal reaction such as an oragnolithium or Grignard reaction upon a 3,6-bis basic ether or thioether of xanthen-9-one (II), or they may be prepared via a benzaldehyde condensation with a 3,6-bis basic ether or thioether of xanthene (IV) as illustrated in the following two reaction schemes:

Scheme 1

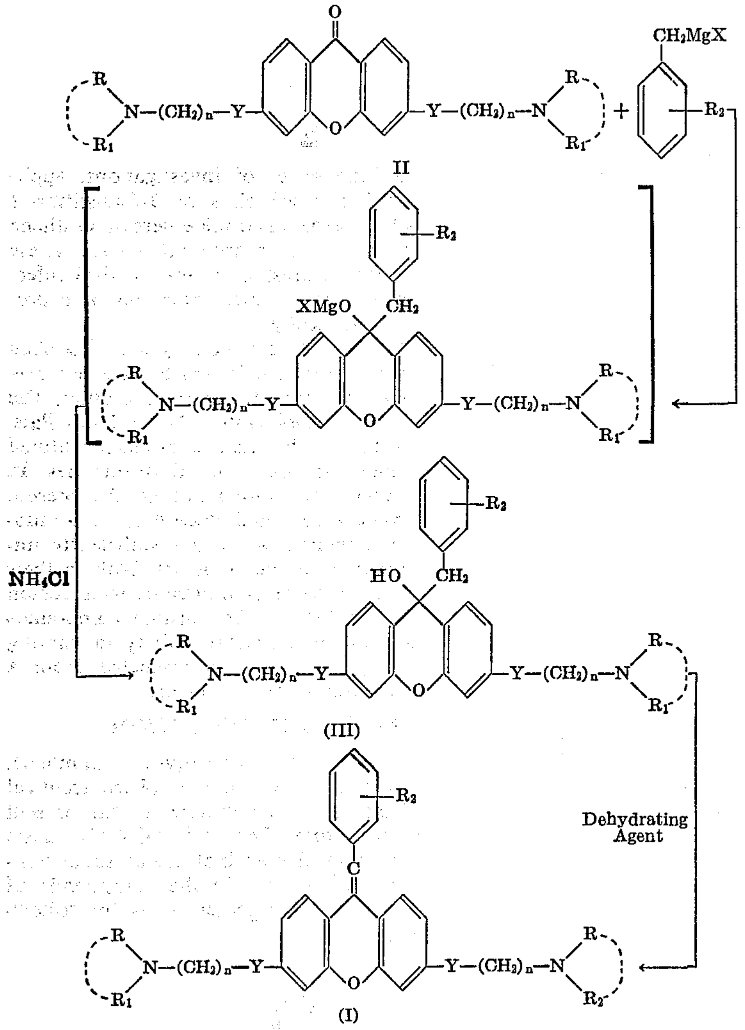

II (III)

(I)

Scheme 2

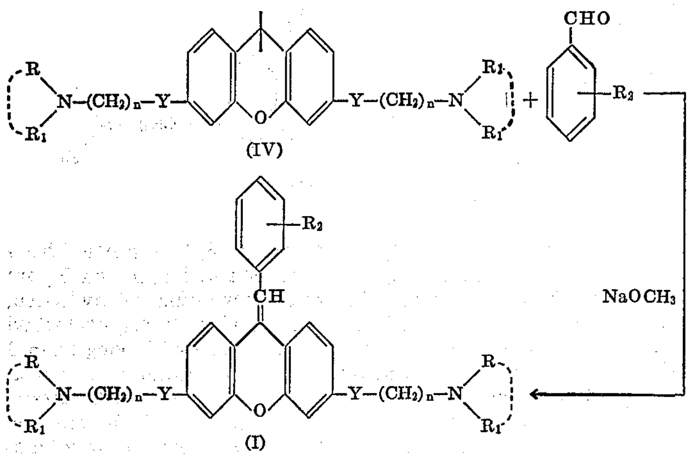

(IV)

(I)

In the above reaction the symbol X is chlorine or bromine and the symbols *n*, Y, R, $R_1$ and $R_2$ have the values previously assigned. The 3,6-bis basic ethers and thioethers of xanthene (IV) and xanthen-9-one (II) useful as starting materials for the preparation of the compounds of the present invention are disclosed in copending application Ser. No. 96,976, filed Dec. 10, 1970, or its counterpart which has been published as Belgium Pat. 776,555.

To achieve an antiviral effect the compounds of this invention are preferably administered to a host using a variety of compositions. Such compositions may be administered either prior to infection, as with a prophylactic use or treatment, or they may be therapeutically administered subsequent to infection, as with a curative use or treatment. The compounds of this invention may also be applied externally or topically directly at the situs of infection, or they may be administered systemically either orally or parenterally, irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from general formula (I) above, the basic ether or thioether side chains are substituted in the 3 and 6-positions of the xanthene ring and consist of a basic amino function separated from the xanthene nucleus by an alkylene chain of prescribed length. It is further apparent that each of these basic side chains is located on a separate benzenoid portion of the xanthene nucleus.

The alkylene chain separating the amino function from the tricyclic ring consists of from 2 to 6 carbon atoms and represents either a straight or branched alkylene chain. Additionally, each of the alkylene chains may be the same or different; preferably, however, both groups are the same. Illustrative of the various alkylene groups which are represented by the symbol $(CH_2)_n$ are: ethylene, 1,3-propylene,1,4-butylene, 1,5-pentylene, 1,6-hexylene, 2-methyl-1,4-butylene and 3-methyl-1,5-pentylene.

The basic amino function can be a primary, secondary or a tertiary amino group. Preferably, each of the amino groups represented by the symbol

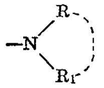

is a tertiary amino group. The symbols R and $R_1$ represent either hydrogen or a lower alkyl group. The term lower alkyl as used with regard to the basic amino function relates to groups having from 1 to 6 carbon atoms. Illustrative of such groups are both straight or branched chain alkyl radicals such as, for example, methyl, ethyl, *n*-propyl, isopropyl, *n*-butyl, *sec*-butyl, isoamyl, *n*-pentyl and *n*-hexyl. When R and $R_1$ each represent lower alkyl, a preferred subgenus is formed.

Each R and $R_1$ of the basic amino function can also represent a cycloalkyl group having from 3 to 6 carbon atoms. Such groups include the cyclopropyl, cyclobutyl, cyclopentyl and cyclohexyl radicals.

The symbols R and $R_1$ also represent an alkenyl group, having from 3 to 6 carbon atoms. In addition to the unsaturation which must be present, this unsaturation must be in a position other than the 1-position of the alkenyl group to prevent hydrolysis from occurring. Illustrative of such unsaturated groups are the allyl, 3-butenyl and the 4-hexenyl radicals.

R and $R_1$ also represent various saturated, monocyclic, heterocyclic radicals when taken in conjunction with the amino nitrogen atom to which they are attached. Typical of such heterocyclic groups are the 1-pyrrolidinyl, piperidino and morpholino radicals. Compounds containing such groups are readily prepared and typify saturated, monocyclic, heterocyclic radicals which are generally useful in lieu of the dilower alkylamino groups present in the compounds of this invention.

The benzylidene moiety substituted in the 9-position of the xanthene nucleus may be either benzylidene itself or a mono-substituted benzylidene. Additionally, the substituents may be in either the ortho, meta or parapositions. Illustrative of the substituents which are represented by the symbol $R_2$ can be mentioned various halogens, as for example, fluorine, chlorine, bromine, iodine; lower alkyl groups having from 1 to 4 carbon atoms, as for example, methyl, ethyl, isopropyl and *n*-butyl; and simple ether groups having from 1 to 4 carbon atoms, such as methoxy, ethoxy and butoxy.

Illustrative of specific base compounds of the present invention represented by general formula (I) above, are:

9-(2-chlorobenzylidene)-3,6-bis(3-piperidinopropoxy) xanthene,
9-benzylidene-3,6-bis(4-morpholinobutylthio)xanthene,
3,6-bis(3-aminopropoxy)-9-(4-methoxybenzylidene) xanthene,
3,6-bis[5-(dibutylamino)pentoxy]-9-(4-methyl-benzylidene)xanthene,
9-(4-bromobenzylidene)-3,6-bis[3-(diallylamino)propoxy]xanthene,
9-benzylidene,3,6-bis[4-(mono-*n*-butylamino)butylthio] xanthene,
9-(4-chlorobenzylidene)-3,6-bis[3-(1-pyrrolidinyl)propoxy]xanthene,
9-(4-bromobenzylidene)-3,6-bis[5-(diethylamino) pentoxy]xanthene,
9-(2-bromobenzylidene)-3,6-bis[3-dicyclohexylamino) propylthio]xanthene, and
9-benzylidene-3,6-bis(3-piperidinopropylthio)xanthene.

The expression "pharmaceutically acceptable acid addition salts" is intended to apply to any non-toxic organic or inorganic acid addition salts of the base compounds represented by formula (I). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids, as for example, acetic, glycolic, lactic, pyruvic, malonic, succinic, glutaric, fumaric, malic, tartaric, citric, ascorbic, maleic, hydroxymaleic, benzoic, *p* - hydroxybenzoic, phenylacetic, cinnamic, salicylic, 2 - phenoxybenzoic and sulfonic acids such as methane sulfonic acid and 2-hydroxyethane sulfonic acid. Either the mono or the di-acid salts can be formed, and such salts can exist in either a hydrated or a substantially anhydrous form.

The 3,6-bis basic ethers and thioethers of 9-(substituted)benzylidene-xanthene claimed and described herein can be prepared by reacting a lithium or Grignard reagent with a 3,6-bis basic ether or thioether of xanthen-9-one as indicated in Scheme 1 above. The 3,6-bis basic ethers and thioethers of xanthen-9-one which serve as starting materials can be prepared using a variety of procedures. For example, 3,6 - dihydroxyxanthen-9-one can be condensed with an aminoalkyl halide or aminoalkyl halide salt in a suitable solvent such as chloroform, chlorobenzene, N,N-dimethylformamide, a lower aliphatic alcohol or a hydrocarbon solvent such as benzene, toluene or xylene. Preferably the condensation takes place in the presence of a condensing agent such as sodium methoxide sodium ethoxide, sodium carbonate, potassium hydroxide, sodium hydroxide or sodium amide. Specific illustrations and procedures for the preparation of these 3,6-bis basic xanthen-9-one ethers and thioethers are to be found more fully disclosed in Ser. No. 96,976 filed Dec. 10, 1970, or its counterpart which has been published as Belgium Pat. 776,555.

The reaction of the 3,6-bis basic ethers or thioethers of xanthen-9-one (II) with a Grignard reagent is generally conducted in two stages. The first stage involves the preparation of an organometallic reagent, which is then reacted during the second stage with a 3,6-bis basic xanthen-9-one ether or thioether. The tertiary alcoholate intermediate thereby obtained is hydrolyzed to the corresponding tertiary alcohol, i.e., a 9-(substituted)benzyl-3,6-bis basic ether or thioether of xanthen-9-ol (III). Should the tertiary alcohol be sensitive to strong acids, hydrolysis can be conveniently conducted using a saturated solution of ammonium chloride which serves to precipitate basic magnesium salts while permitting the tertiary alcohol to remain in the organic solvent layer. Upon acidification the tertiary alcohols are subsequently dehydrated, either spontaneously or with the help of a suitable dehydrating agent, thus forming the desired 9-(substituted)benzylidene-3,6-bis basic ethers and thioethers of xanthene.

The organometallic Grignard reagent is conveniently prepared by reacting magnesium with a benzyl halide or a substituted benzyl halide. Illustrative of the various benzyl halides which can be employed are: benzyl chloride, 4-methylbenzyl chloride, 4-methoxybenzyl chloride, 2-methoxybenzyl chloride and 4-chlorobenzyl chloride. The conditions for the Grignard reaction are not critical and are within the purview of those skilled in the art, the usual precautions being taken, however, to exclude moisture during the course of the reaction. A variety of solvents, commonly employed for Grignard reactions can also be employed in the present invention, as for example, diethyl ether or tetrahydrofuran. Generally, the Grignard reagent is not isolated as such but prepared and permitted to react *in situ* with an appropriate 3,6-bis basic ether or thioether of xanthen-9-one.

The conditions for the reaction of the Grignard reagents with the xanthen-9-one ethers or thioethers are not deemed critical. A number of suitable organic solvents can be employed. The term suitable organic solvents is intended to refer to those solvents in which the starting materials are reasonably soluble and which are also nonreactive or only slowly reactive with the Grignard reagent being used. Thus, the reaction may be conducted in solvents such as anhydrous diethyl ether, benzene, tetrahydrofuran, dioxane, hexamethylphosphoramide or mixtures thereof. The organometallic reagent may be prepared in a single solvent or in a mixture of solvents and the bis basic ether or thioether added thereto, either as a suspension or as a solution, using the same or a different solvent combination. The temperature at which the reaction is conducted can vary from about 0° to about 110° C. Generally, however, as a matter of convenience the reflux temperature of the particular solvent selected is utilized in order to ensure completion of the reaction within a reasonable period of time. The Grignard reaction is continued for periods of time which range anywhere from about 1 to about 24 hours. Preferably, the reaction is conducted in diethyl ether at its reflux temperature for a period of from about 1 to about 8 hours.

If so desired, the 9-(substituted)benzyl-3,6-bis basic ethers or thioethers of xanthen-9-ol (III) can be obtained by careful isolation from the Grignard reaction mixture, care being taken to avoid acidic conditions. Particularly useful in this regard is the addition of the Grignard complex to a mixture of ice and a saturated aqueous ammonium chloride solution. The xanthen-9-ols are generally isolated as the free base compounds due to the facile dehydration in the presence of mineral acids of the tertiary alcohol under relatively mild conditions.

Alternatively, the intermediate xanthen-9-ols can be dehydrated *in situ* using suitable dehydrating agents. Dehydration, which may also occur spontaneously during the isolation procedure, is generally promoted by the addition of a dehydrating agent either with or without the application of external heat. The ease of dehydration varies widely depending upon the particular substitution in the benzal moiety as well as the particular xanthene bis basic ether or thioether side chain present. In some instances aqueous mineral acids such as hydrochloric acid, sulfuric acid and toluenesulfonic acid are sufficient to effect dehydration at room temperatures. For those tertiary alcohols which are more resistant to dehydration, stronger dehydrating agents, such as thionyl chloride and phosphorous oxychloride, can be successfully employed. The desired 9-(substituted)benzylidene-3,6-bis basic ethers or thioethers of xanthene (I), resulting from the dehydration of the corresponding 9-(substituted)benzyl-3,6-bis basic ethers or thioethers of xanthen-9-ol (III) are ordinarily isolated in crystalline form as their dihydrochloride salts and can be further purified by recrystallization from various organic solvents such as the lower aliphatic alcohols, ethyl acetate, butyl acetate, butanone, toluene or mixtures thereof.

The methylene group of the 3,6-bis basic ethers or thioethers of xanthene (IV), which is located between the two benzenoid moieties of the xanthene nucleus, contains a reactive hydrogen atom which will condense with aldehydes and esters of carboxylic acids in the presence of a condensing agent such as sodium methoxide and ethoxide. Thus, the compounds of the present invention can be prepared via an alternate route which involves the condensation of a 3,6-bis basic ether or thioether of xanthene (IV) with benzaldehyde or a mono-substituted benzaldehyde as is indicated in general reaction Scheme 2 above.

The 3,6-bis basic ethers and thioethers of xanthene which serve as starting materials for the benzaldehyde condensation can be obtained by the condensation of 3,6-dihydroxyxanthene with an appropriate aminoalkyl halide or aminoalkyl halide salt in a suitable solvent medium. Generally, a base is added in order to assist the condensation reaction, the preferred base being sodium methoxide. However, other bases such as sodium hydride, sodium amide, sodium hydroxide and potassium hydroxide can also be successfully employed. A wide variety of solvents can be used as the reaction medium. For example, aromatic hydrocarbons, such as benzene, toluene, xylene, halogenated aromatic hydrocarbons, such as chlorobenzene, aprotic solvents such as N,N-dimethylformamide, N,N-dimethylacetamide and dimethylsulfoxide, lower aliphatic alcohols, and ethers such as tetrahydrofuran and dioxane are useful. Approximately 2.5 equivalents of the base to be employed are added to a solution which contains 1 equivalent of 3,6-dihydroxyxanthene a solution containing from about 2.5 to 3.0 equivalents of a haloalkyl amine is then added and the entire mixture heated to the reflux temperature of the solvent medium employed for a period which may vary from about 4 to about 24 hours. Isolation of the 3,6-bis basic ethers and thioethers of xanthene (IV) so prepared is achieved without difficulty using procedures apparent to those skilled in the art.

The condensation of the 3,6-bis basic ethers and thioethers of xanthene with benzaldehyde or with mono-substituted benzaldehydes to prepare the compounds of the present invention proceeds without difficulty. In general, the 3,6-bis basic xanthene ethers and thioethers are dissolved in solvents such as pyridine, N,N-dimethylformamide, benzene, toluene or a lower aliphatic alcohol, and the benzaldehyde or mono-substituted benzaldehyde is added with stirring, either in solution or as a solid *per se,* in the presence of a condensing agent. The resulting reaction mixture is heated to a temperature ranging from about 50° to about 160° C. Generally, the reflux temperature of the solvent selected is preferred as a matter of convenience. The reaction is conducted at elevated temperatures for periods of time ranging from anywhere from 1 to 5 hours to ensure completion of the reaction.

The compounds of the present invention are antiviral agents. Preferably they are administered to an animal host to prevent or inhibit viral infections. The term host refers to any viable biological material or intact animal including humans which is capable of inducing the formation of interferon and which serves as a support means for virus replication. The host can be of animal or mammalian origin. Illustratively such hosts include birds, mice, rats, guinea pigs, gerbils, ferrets, dogs, cats, cows, horses and humans. Other viable biological material such as used in the production of vaccines may also act as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as influenza $A_2$ (Jap./305)

virus; arboviruses, such as Semliki forest virus; the herpes group of viruses, including herpes simplex; and the poxviruses, as for example vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated with a side by side comparison of the treated surviving animals and the untreated control group of deceased animals.

Respiratory viruses, such as influenza $A_2$ (Jap./305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse treated with a normally fatal infection of encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size as to statistically reduce to a negligible amount the influence of such a chance survivor upon the test results.

The vaccinia test virus is typical of the dermatotrophic type viruses which respond to treatment wtih compositions containing the compounds of the instant invention. The vaccinia virus generally produces a nonfatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test virus systems.

The mode of activity of the active ingredients of the present invention is not rigorously defined. *Inter alia,* the compounds of the present invention may induce the formation of interferon in a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intracellular replication of the virus without appearing to have any inactivation effect *per se* upon the virus itself. A few of the viruses susceptible to interferon replication inhibition are described in Horsfall and Tamm, "Viral and Rickettsial Infections of Man" 4th Edition (1965), J. B. Lippincott Company, pp. 328–9.

As previously indicated, the compounds of the present invention may be prophylactically administered in order to prevent the spread of contagious viral diseases or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, they should be administered within about 1 or 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg. to about 500 mg. per kg. of body weight. Illustratively, dosage levels of the administered active ingredients for intravenous treatment range from about 0.1 mg. to about 10 mg. per kg. of body weight; for intraperitoneal administration range from about 0.1 mg. to about 50 mg. per kg. of body weight; for subcutaneous administration range from about 0.1 mg. to about 250 mg. per kg. of body weight; for oral administration may be from about 0.1 mg. to about 500 mg. per kg. of body weight; for intranasal instillation range from about 0.1 mg. to about 10 mg per kg. of body weight; and for aerosol inhalation therapy, the range is generally from about 0.1 mg. to about 10 mg. per kg. of body weight.

The novel compounds described herein can also be administered in various different dosage unit forms, e.g., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg. to over 3.0 g. of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A suitable method of administration for the compounds of the present invention is orally either in a solid dose form such as a tablet or capsule, or in a liquid dose form such as an elixir, suspension, emulsion or syrup. Ordinarily the active ingredient comprises from about 0.5% to about 10% by weight of an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compositions may contain a non-ionic surfactant having a hydrophile-lipophile balance (HLB) of from about 12 to about 17. The quantity of surfactant in such formulations ranges from about 5% to about 15% by weight. The surfactant can be a single component having the above identified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components comprising liquid pharmaceutical excipients previously mentioned.

The active ingredients of the present invention can also be admixed directly with animal feeds or incorporated into the drinking water of animals. For most purposes, an amount of active ingredient is used which provides from about 0.0001% to about 0.1% and preferably, from about 0.001% to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE I

3,6-Dihydroxyxanthen-9-one 2,2′,4,4′-tetrahydroxybenzophenone, 50 g., is dissolved in 300 ml. of boiling water, transferred to a warmed pressure bomb, and heated at 220° C. for 2 hours. The solution is cooled and the 3,6-dihydroxyxanthen-9-one, 45.5 g., so obtained is filtered in 95% yield as an amorphous orange solid having a melting point greater than 300° C.

EXAMPLE II

3,6-Bis[2-(dimethylamino)ethoxy]xanthen-9-one

To a solution of 39.0 g. (0.717 mole) of sodium methoxide in 240 ml. of methanol is added 54.5 g. (0.24 mole) of 3,6-dihydroxyxanthen-9-one and 700 ml. of chlorobenzene. The reaction mixture is distilled until the temperature of the distillate reaches 130° C. in order to remove the methanol. The reaction mixture is cooled to about 100° C., 2-dimethylaminoethyl chloride, 64.0 g. (.590 mole) is added and the mixture refluxed for a period of 4½ hours. The reflux mixture is cooled, 600 ml. of water containing 20 ml. of a 50% sodium hydroxide solution is added and stirring is continued for a period of 30 minutes. The aqueous layer is separated and extracted with several portions of chloroform. The combined organic extracts are dried over magnesium sulfate, filtered and evaporated *in vacuo*. The 3,6-bis[2-(dimethylamino)ethoxy]xanthen-9-one so prepared is recrystallized once from an ethyl alcohol-water mixture and again from water to give a product having a M.P. 87.5–88.5° C.

Following essentially the same procedure but substituting the following aminoalkyl halides: 2-diethylaminoethyl chloride, 2-morpholinoethyl chloride, 3-diallylaminopropyl chloride and 4-di(*n*-butyl)aminobutyl chloride for the 2-dimethylaminoethyl chloride above results in the formation of the following 3,6-bis basic ethers of xanthen-9-one, respectively: 3,6-bis[2-(diethylamino)ethoxy]xanthen-9-one, 3,6 - bis(2-morpholinoethoxy)xanthen-9-one, 3,6-bis[3-(diallylamino)propoxy]xanthen-9-one and 3,6-bis[4-(di-*n*-butylamino)butoxy]xanthen-9-one.

EXAMPLE III

O,O-Bis-3,6-(9-oxoxanthenyl)dimethylthiocarbamate

To a cooled solution of 90.8 g. (0.4 mole) of 3,6-dihydroxyxanthen-9-one dissolved in 450 ml. of dimethylformamide is slowly added with continued cooling 32 g. (0.8 mole) of sodium hydride. The solution is stirred until all gaseous evolution ceases and is slowly permitted to warm to room temperature. Dimethylthiocarbamoyl chloride, 100 g. (0.8 mole), is added and stirring continued at room temperature for an additional 16 hours. The solution is heated at 80° C. for 1½ hours, cooled and poured into 1½ liters of water. The O,O-bis-3,6-(9-oxoxanthenyl)dimethylthiocarbamate so prepared is obtained as an orange-yellow solid which when recrystallized twice from dimethylformamide forms yellow needles having a m.p. 253–5° C.

EXAMPLE IV

S,S,-Bis-3,6-(9-oxoxanthenyl)dimethylthiocarbamate

O,O - bis-3,6-(9-oxoxanthenyl)dimethylthiocarbamate, prepared as in the preceding Example, is pyrolyzed by heating in an oil bath at a temperature ranging from about 242° to 295° C. for a period of 30 minutes. Upon cooling the residue, which contains the desired product, S,S-bis-3,6-(9-oxoxanthenyl)dimethylthiocarbamate is recrystallized twice from a dimethylformamide-water mixture and twice again from a chloroform-hexane mixture to give a product having a M.P. 177.5–9.5° C.

EXAMPLE V

3,6-Bis[2-(diethylamino)ethylthio]xanthen-9-one dihydrochloride

A mixture of 34.0 g. (.084 mole) of S,S-bis-3,6-(9-oxoxanthenyl)dimethylthiocarbamate, 200 ml. of methanol and 200 ml. of a 25% sodium hydroxide solution is heated to its reflux temperature in a nitrogen atmosphere until solution is complete. Chlorobenzene, 700 ml., is added and the methanol-water is co-distilled until the distillate temperature reaches 125° C. The solution is cooled, 37.5 g. (.278 moles) of 2-diethylaminoethyl chloride is added and the mixture refluxed under nitrogen for a period of 8 hours. The reaction mixture is cooled, 300 ml. of a 10% sodium hydroxide solution added and the mixture is extracted, first with ether followed by a chloroform extraction. The organic extracts are combined, washed with water, dried over magnesium sulfate, filtered and evaporated *in vacuo* to leave a brown oily residue. The residue is dissolved in ether and ethereal hydrochloric acid is added to precipitate the crude 3,6-bis[2-(diethylamino)ethylthio]xanthen-9-one as a dihydrochloride salt, which when recrystallized twice from ethanol yields a product having a M.P. 227–9° C. (dec.).

Following essentially the same procedure but substituting 4-morpholinobutyl chloride, 4-di-*n*-butylaminobutyl chloride, 3-dicyclohexylaminopropyl chloride and 3-piperidinopropyl chloride for the 2-diethylaminoethyl chloride above, results in the formation of the following compounds, respectively: 3,6 - bis(4 - morpholinobutylthio) xanthen - 9 - one, 3,6-bis[4-(di-*n*-butylamino)butylthio] xanthen-9-one, 3,6-bis[3-(dicyclohexylamino)propylthio] xanthen-9-one and 3,6 - bis(3 - piperidinopropylthio)xanthen-9-one.

EXAMPLE VI 9-(4-Chlorobenzyl)-3,6-bis[2-diethylamino)ethoxy] xanthen-9-ol

To 10 ml. of dry diethyl ether is added 2.4 g. (0.1 mole) of magnesium turnings. A solution of 16.1 g. (0.1 mole) of *p*-chlorobenzyl chloride dissolved in ether is added in such a rate as to maintain the reaction mixture at a moderate reflux temperature. Upon completing the addition, the reaction mixture is refluxed for an additional 30 minutes and a solution of 10.7 g. (0.025 mole) of 3,6-bis(2-diethylaminoethoxy)xanthen-9-one which is dissolved in 75 ml. of ether, is added to the reaction mixture. The reaction mixture is refluxed an additional four hours, cooled, poured into a cold saturated aqueous solution of ammonium chloride and extracted with chloroform. The combined organic extracts are washed with water, dried over magnesium sulfate, filtered and evaporated to dryness *in vacuo*. The crude 9-(4-chlorobenzyl)-3,6-bis[2-(diethylamino)ethoxy]xanthen-9-ol so prepared is obtained as a yellow oil, which when recrystallized from hexane gives a product having a M.P. 120–121° C.

EXAMPLE VII 9-(4-Chlorobenzylidene)-3,6-bis[2-(diethylamino) ethoxy]xanthene dihydrochloride 9-(4-chlorobenzyl) - 3,6 - bis[2-(diethylamino)ethoxy] xanthen-9-ol, 5.8 g. (.0105 mole), and toluenesulfonic acid monohydrate, 1.0 g. (.005 mole), is dissolved in 300 ml. of benzene and heated at its reflux temperature for a period of 45 minutes. A Dean-Stark trap is utilized to remove the water which is formed during the course of the reaction. The reaction mixture is concentrated to approximately ⅓ its original volume, extracted twice with a 10% sodium hydroxide solution, washed with water, dried over magnesium sulfate, filtered, and evaporated *in vacuo* leaving a yellow, semi-solid oily residue. This residue is extracted with hot pentane and the pentane extract evaporated to dryness. The pentane residue is dissolved in butanone and the desired product precipitated as its citrate salt by the addition of 1.94 g. (0.01 mole) of citric acid dissolved in butanone. The citric acid salt is collected, converted to the base compound by the addition of a 10% sodium hydroxide solution and extracted with ether. The combined ether extracts are washed with water, dried over magnesium sulfate, filtered, evaporated to a small volume and ethereal hydrogen chloride added to precipitate the desired product as its dihydrochloride acid addition salt. The crude 9-(4-chlorobenzylidene)-3,6-bis[2-(diethylamino)ethoxy]xanthene dihydrochloride so obtained is recrystallized three times from a methanol-ethyl acetate mixture to yield a product having a M.P. of 176–8° C., $$\lambda_{max.}^{H_2O}\ 298,\ \text{and}\ E_{1\ cm.}^{1\%}\ 256.$$

Following essentially the same procedure, but substituting 3,6-bis[5-(dibutylamino)pentoxy]-9-(4-methylbenzyl) xanthen-9-ol,
9-(4-bromobenzyl)-3,6,3-bis[3-(diallylamino)propoxy] xanthen-9-ol,
9-(4-chlorobenzyl)-3,6-bis(3-pyrrolidinopropoxy) xanthen-9-ol and
9-benzyl-3,6-bis[3-(dicyclohexylamino)propoxy] xanthen-9-ol for the 9-(4-chlorobenzyl) - 3,6 - bis[2-(diethylamino) ethoxy]xanthen-9-ol above, results in the formation of the following base compounds, respectively;

3,6-bis[5-(dibutylamino)pentoxy]-9-(4-methylbenzylidene)xanthene,
9-(4-bromobenzylidene)-3,6-bis[3-(diallylamino)propoxy]xanthene,
9-(4-chlorobenzylidene)-3,6-bis(3-pyrrolidinopropoxy) xanthene and
9-benzylidene-3,6-bis[3-(dicyclohexylamino)propoxy] xanthene.

EXAMPLE VIII 9-(4-Chlorobenzylidene)-3,6-bis[2-(diethylamino) ethylthio]xanthene dihydrochloride To a suspension of 2.65 g. (0.109 mole) of magnesium turnings in 10 ml. of diethyl ether is added a solution of 17.6 g. (0.109 mole) of 4-chlorobenzyl chloride contained in 50 ml. of ether at a rate sufficient to maintain a gentle reflux. The usual precautions to exclude moisture are maintained and stirring is continued until all of the magnesium is dissolved. The dihydrochloride salt of 3,6-bis-[2-(diethylamino)ethylthio]xanthen-9-one, 14.5 g. (0.027 mole), is dissolved in a 10% sodium hydroxide solution and extracted with ether. The ether extract is washed with water, dried over magnesium sulfate, filtered, concentrated to approximately 100 ml. and slowly added to the prepared Grignard reagent solution at a rate sufficient to maintain the reaction mixture at a gentle reflux. The combined reaction mixture is refluxed for an additional period of 5 hours and poured into a cold saturated aqueous solution of ammonium chloride. The ether layer which separates is washed with water, dried over magnesium sulfate, filtered and evaporated *in vacuo* to an orange-yellow oily residue. The residue is dissolved in ether and extracted into an aqueous hydrochloric acid solution. The aqueous layer is made alkaline with a sodium hydroxide solution and the desired compound is re-extracted into ether. The ether extracts are combined, washed with water, dried over magnesium sulfate, filtered and evaporated *in vacuo* to yield a thick yellow viscous oily residue. This residue is dissolved in a minimum amount of ether and ethereal hydrogen chloride is added dropwise until no further salt formation occurs. The hydrochloride salt is filtered, dissolved in sufficient methanol to effect solution and sufficient hot ethyl acetate added to the point of incipient cloudiness. Upon cooling, 9-(4-chlorobenzylidene)-3,6-bis[2 - (diethylamino)ethylthio]xanthene is obtained as a crude dihydrochloride salt. Recrystallization from a methanol-ethyl acetate mixture results in a product having a m.p. 232–4° C. (dec.).

$$\lambda_{max.}^{H_2O}\ 299,\ \text{and}\ E_{cm.}^{1\%}\ 334.$$

Following essentially the same procedure but substituting 4-methoxybenzyl magnesium chloride, benzyl magnesium chloride, and 4-methylbenzyl magnesium chloride for the 4-chlorobenzyl magnesium chloride above, results in the formation of 3,6-bis[2-(diethylamino)ethylthio]-9 - (4 - methoxybenzylidene)xanthene dihydrochloride, 9-benzylidene - 3,6 - bis[2-(diethylamino)ethylthio]xanthene dihydrochloride and 3,6-bis[2-(diethylamino)ethylthio]-9-(4 - methylbenzylidene)xanthene dihydrochloride, respectively.

EXAMPLE IX

The following example is illustrative of the antiviral activity for the compounds of the present invention.

Thirty mice weighing approximately 12 to 15 gms. each are divided into two groups, a control group of 20 animals and a test group of 10 animals. All of the animals are challenged with a fatal dose ($12LD_{50}$) of encephalomyocarditis virus. The test group of animals are tested both prophylactically and therapeutically using a parenteral composition containing 9-(4-chlorobenzylidene)-3,6-bis-[2-(diethylamino)ethylthio]xanthene dihydrochloride as the active ingredient dissolved in a solution of 0.15% aqueous hydroxyethylcellulose solution as the vehicle. The composition contains the active ingredient in an amount such that each dosage contains 0.25 ml. which is equivalent to a dose level of 50 mg. per kg. The control group receives a subcutaneous placebo containing the same volume of vehicle without, of course, the active ingredient. Observations over a 10 day period show the termination of all the control animals within a period of from 4 to 5 days, with the treated group surviving for a statistically longer period of time.

EXAMPLE X

Preparation of a capsule formulation

An illustrative composition for hard gelatin capsules is as follows:

| | Mg. Per Capsule |
|---|---|
| (a) 9-(4-chlorobenzylidene)-3,6-bis[2-(diethylamino)ethylthio]xanthene dihydrochloride | 200 |
| (b) Talc | 35 |

The formulation is prepared by passing the dry powders of both (a) and (b) through a fine mesh screen and mixing them well. The powder is then filled into No. 0 hard gelatin capsules at a net fill of 235 mg. per capsule.

In a similar fashion, a soft gelatin capsule can be prepared in which the talc is omitted. The dry 9-(4-chlorobenzylidene) - 3,6 - bis[2-(diethylamino)ethylthio]xanthene dihydrochloride powder can be filled as a granulation, slug or compressed tablet directly into the rotary dye or plate mold in which the soft gelatin capsule is formed.

EXAMPLE XI

Preparation of an oral syrup formulation

A 2% weight per volume syrup of 9-(4-chlorobenzylidene)-3,6-bis[2 - (dimethylamino)ethylthio]xanthene dihydrochloride is prepared by the usual pharmaceutical techniques in accordance with the following formula:

| | Grams |
|---|---|
| (a) 9-(4-chlorobenzylidene)-3,6-bis[2-(dimethylamino)ethylthio]xanthene dihydrochloride | 2.0 |
| (b) Sucrose | 33.3 |
| (c) Chloroform | 0.25 |
| (d) Sodium benzoate | 0.4 |
| (e) Methyl *p*-hydroxybenzoate | 0.02 |
| (f) Vanillin | 0.04 |
| (g) Glycerol | 1.5 |
| (h) Purified water to 100.0 ml. | |

EXAMPLE XII

Preparation of parenteral formulation

An illustrative composition for a parenteral injection is the following emulsion:

| Ingredient | Each ml. contains | Amount, g. |
|---|---|---|
| 9-(4-chlorobenzylidene)-3,6-bis[2-(dimethylamino)ethoxy]xanthene. | 50 mg. | 1.000 |
| Polyoxyethylene sorbitan monooleate | 100 mg. | 2.000 |
| Sodium chloride | 0.0064 mg. | 0.128 |
| Water for injection, q.s. | | (1) |

(1) 20.000 ml.

The parenteral composition is prepared by dissolving 0.64 g. of sodium chloride in 100 ml. of water for injection, mixing the polyoxyethylene sorbitan monooleate with the 9-(4-chlorobenzylidene)-3,6-bis[2 - (dimethylamino) ethoxy]xanthene, adding a sufficient solution of the sodium chloride in water to the active ingredient and polyoxyethylene sorbitan monooleate to make 20 ml., shaking the mixture and then autoclaving the mixture for 20 minutes at 110° C. at 15 p.s.i.g. steam pressure. The composition can be dispensed in a single ampule for multiple dosage or in 10 or 20 ampules for single dosages.

EXAMPLE XIII

Preparation of dusting powder formulation

The following formulation illustrates a dusting powder for topical use:

| | Gm. Per Kilogram |
|---|---|
| (a) 9-(4-chlorobenzylidene) - 3,6 - bis[2-(diethylamino)ethoxy]xanthene | 20 |
| (b) Silica aerogel | 980 |

The dusting powder is prepared by intimately blending the ingredients. The resulting mixture is then packaged in suitable dispensing containers.

We claim:

1. A 3,6-bis basic derivative of 9-(substituted) benzylidenexanthene having the general formula:

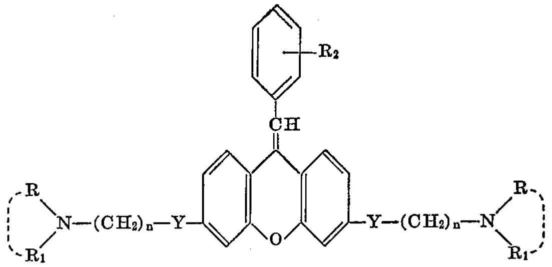

wherein *n* is an integer of from 2 to 6; Y is selected from the group consisting of oxygen and sulfur; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical; $R_2$ is selected from the group consisting of hydrogen, halogen, lower alkyl and lower alkoxy; and the pharmaceutically acceptable acid addition salts thereof.

2. A compound of claim 1 wherein $R_2$ is halogen.

3. A compound of claim 1 wherein Y is oxygen.

4. A compound of claim 1 wherein Y is sulfur.

5. The compound 9-(4-chlorobenzylidene)-3,6-bis[2-(diethylamino)ethylthio]xanthene and the pharmaceutically acceptable acid addition salts thereof.

6. The compound 9-(4-chlorobenzylidene)-3,6-bis[2-(diethylamino)ethoxy]xanthene and the pharmaceutically acceptable acid addition salts thereof.

7. The compound 9-(4-chlorobenzylidene)-3,6-bis[2-(dimethylamino)ethoxy]xanthene and the pharmaceutically acceptable acid addition salts thereof.

References Cited

UNITED STATES PATENTS

| | | | |
|---|---|---|---|
| 2,732,373 | 1/1956 | Steiger | 260—279 |
| 3,555,043 | 1/1971 | Archer | 260—328 |
| 3,597,420 | 8/1971 | Archer | 260—240 TC |

JOHN D. RANDOLPH, Primary Examiner

U.S. Cl. X.R.

424—248, 267, 274, 275, 278; 260—240.1

UNITED STATES PATENT OFFICE
CERTIFICATE OF CORRECTION

PATENT NO. : 3,829,440

DATED : August 13, 1974

INVENTOR(S) : Albert A. Carr and Joyce F. Grunwell

It is certified that error appears in the above-identified patent and that said Letters Patent are hereby corrected as shown below:

Column 2, lines 62-63, "oragno-lithium" should read "organo-lithium". Column 3, Scheme I, Structure I,

"

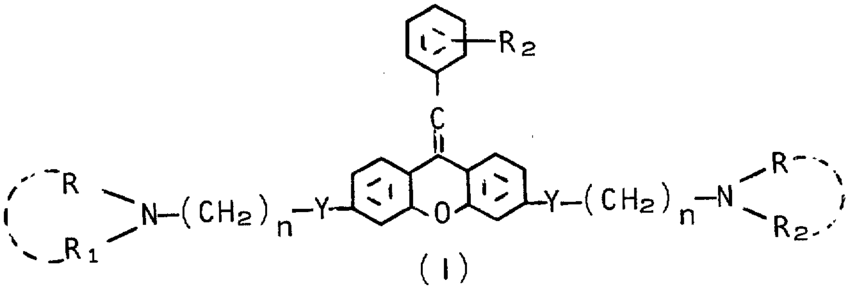

(I)

"

should read

"

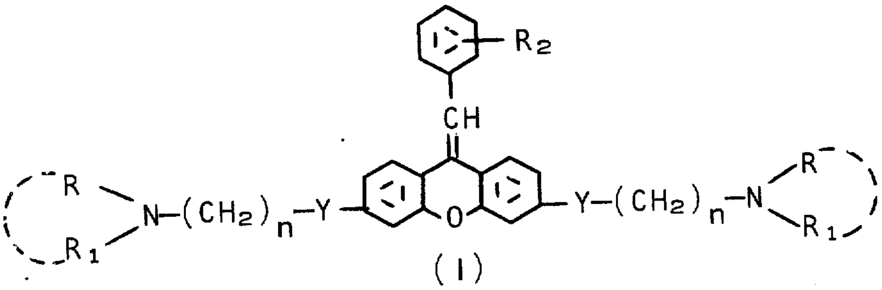

(I)

"

UNITED STATES PATENT OFFICE

CERTIFICATE OF CORRECTION

PATENT NO. : 3,829,440

DATED : August 13, 1974

INVENTOR(S) : Albert A. Carr and Joyce F. Grunwell

It is certified that error appears in the above-identified patent and that said Letters Patent are hereby corrected as shown below:

Column 3, Scheme 2, Structure IV " 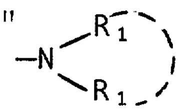 " should read " 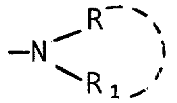 ". Column 6, lines 8-9, "9-benzylidene,3,6-bis[4-mono-n-butylamino)butylthio]xanthene," should read "9-benzylidene-3,6-bis[4-mono-n-butylamino)butylthio]xanthene,". Column 9, line 43, "wtih" should read "with". Column 13, line 23 "9-(4-Chlorobenzyl)-3,6-bis[2-diethylamino)ethoxy]" should read "9-(4-Chlorobenzyl)-3,6-bis[2-(diethylamino)ethoxy]".

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*